United States Patent
Pieri

(10) Patent No.: US 10,641,131 B2
(45) Date of Patent: May 5, 2020

(54) EXTRACTING STEAM FROM A TURBINE

(71) Applicant: Nuovo Pignone S.R.L., Florence (IT)

(72) Inventor: Marco Pieri, Siena (IT)

(73) Assignee: Nuovo Pignone S.R.L., Florence (IT)

( * ) Notice: Subject to any disclaimer, the term of this patent is extended or adjusted under 35 U.S.C. 154(b) by 130 days.

(21) Appl. No.: 16/016,732

(22) Filed: Jun. 25, 2018

(65) Prior Publication Data

US 2018/0298786 A1 Oct. 18, 2018

Related U.S. Application Data

(63) Continuation of application No. 14/977,713, filed on Dec. 22, 2015, now Pat. No. 10,030,544.

(60) Provisional application No. 62/237,623, filed on Oct. 6, 2015.

(51) Int. Cl.
| | |
|---|---|
| *F01K 7/16* | (2006.01) |
| *F01D 17/00* | (2006.01) |
| *F01D 17/10* | (2006.01) |
| *F01D 17/14* | (2006.01) |
| *F02C 9/00* | (2006.01) |

(52) U.S. Cl.
CPC ............ *F01K 7/165* (2013.01); *F01D 17/00* (2013.01); *F01D 17/10* (2013.01); *F01D 17/14* (2013.01); *F01D 17/145* (2013.01); *F02C 9/00* (2013.01)

(58) Field of Classification Search
CPC .......... F01D 17/00; F01D 17/10; F01D 17/14; F01D 17/145; F01K 7/165; F02C 9/00
See application file for complete search history.

(56) References Cited

U.S. PATENT DOCUMENTS

| | | | |
|---|---|---|---|
| 3,966,355 A | 6/1976 | Pierpoline | |
| 3,999,787 A * | 12/1976 | Park | F01D 17/24 |
| | | | 290/40 R |
| 4,380,146 A * | 4/1983 | Yannone | F02C 9/26 |
| | | | 60/39.281 |
| 5,409,351 A | 4/1995 | Geist | |
| 5,799,927 A | 9/1998 | Geist | |
| 2014/0047840 A1* | 2/2014 | Snider | F01K 7/165 |
| | | | 60/660 |

(Continued)

FOREIGN PATENT DOCUMENTS

| | | |
|---|---|---|
| DE | 102011108487 A1 | 1/2013 |
| WO | 2015105603 A1 | 7/2015 |

OTHER PUBLICATIONS

International Search Report and Written Opinion issued in connection with corresponding PCT Application No. PCT/EP2016073652 dated Dec. 9, 2016.

*Primary Examiner* — Igor Kershteyn
(74) *Attorney, Agent, or Firm* — Paul Frank + Collins P.C.

(57) ABSTRACT

A valve assembly for use to regulate a flow of steam in a flowpath of a turbine. The valve assembly can be configured with a body that circumscribes a rotor. The body is disposed upstream of the rotor blades. In one implementation, the body forms an annular ring with a plurality of arcuate segments, each being configured to move independently of the other segments in the ring to change the size of an annular gap between the arcuate segments and the rotor. The size of the annular gap corresponds with flow parameters for working fluid that flows across the rotor and that exits the turbine for use in pre-heaters and like collateral equipment.

20 Claims, 13 Drawing Sheets

(56) References Cited

U.S. PATENT DOCUMENTS

| | | | |
|---|---|---|---|
| 2014/0208751 A1* | 7/2014 | Bowan | F01K 7/165 |
| | | | 60/647 |
| 2015/0226089 A1 | 8/2015 | Roy et al. | |
| 2016/0258361 A1* | 9/2016 | Tiwari | F02C 9/00 |
| 2016/0333794 A1* | 11/2016 | Baladi | F02C 9/18 |
| 2018/0171818 A1* | 6/2018 | Nimchan | F16K 31/1221 |

* cited by examiner

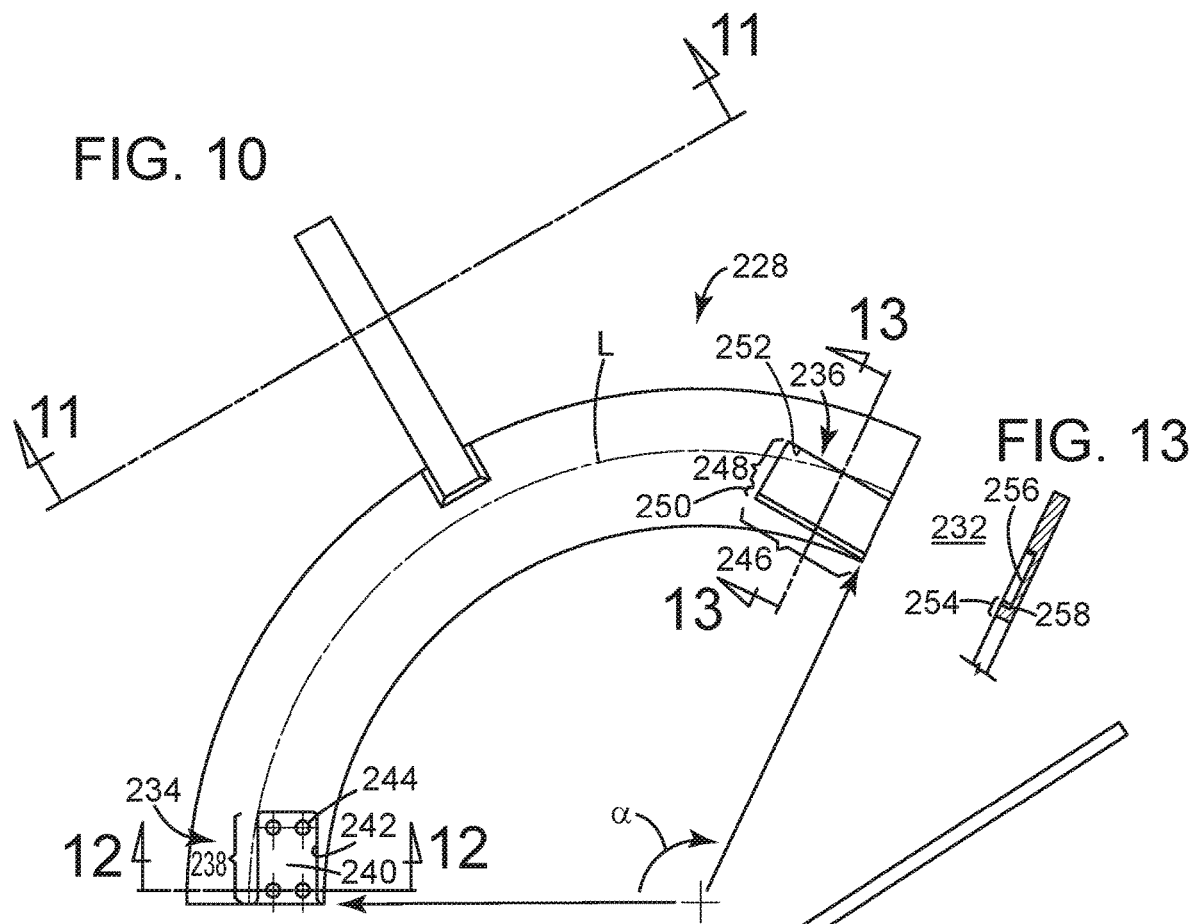
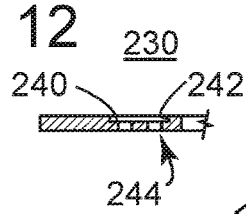
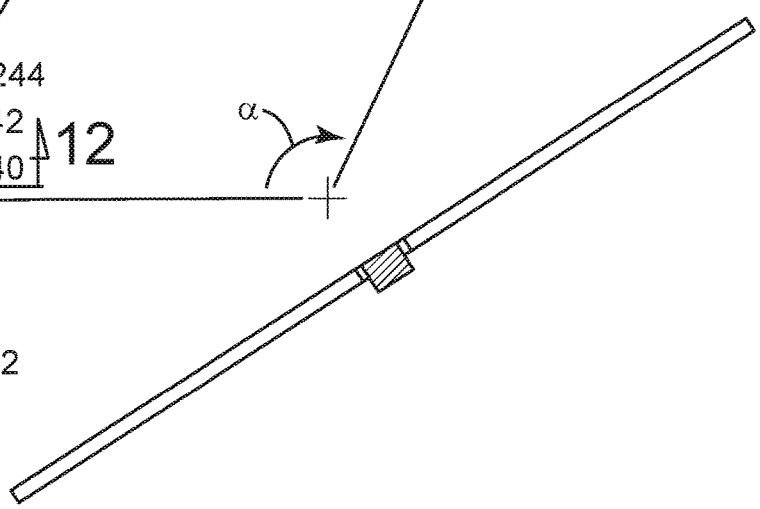

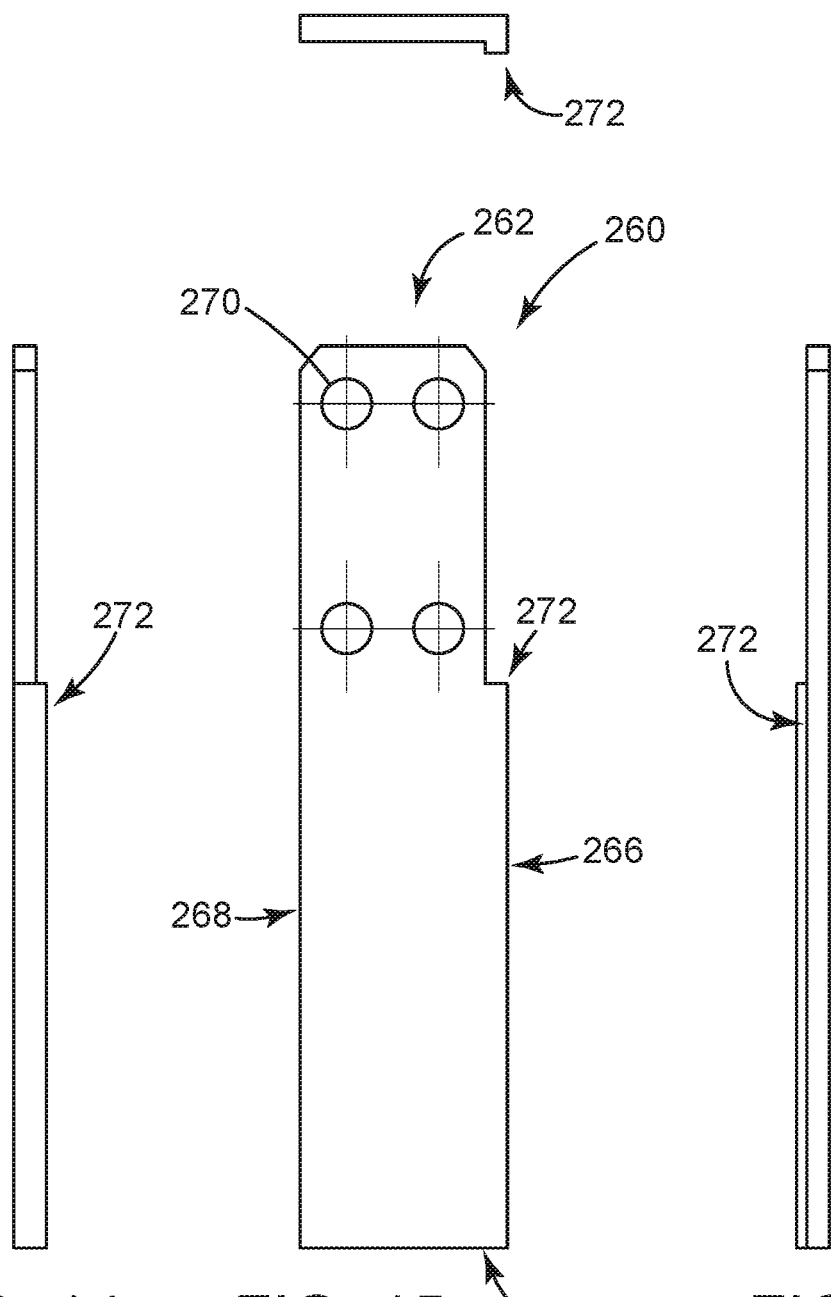

EXTRACTING STEAM FROM A TURBINE

CROSS-REFERENCE TO RELATED APPLICATIONS

This application is a continuation of U.S. Ser. No. 14/977,713, filed at Dec. 22, 2015, and entitled "EXTRACTING STEAM FROM A TURBINE," which claims the benefit of priority to U.S. Provisional Application Ser. No. 62/237,623, filed Oct. 6, 2015, and entitled "EXTRACTING STEAM FROM A TURBINE." The content of these applications is incorporated by reference herein in its entirety.

BACKGROUND

Engineers expend great efforts to improve performance and efficiency of industrial machines. These machines include turbines and complex systems that are configured to generate power (e.g., electrical power) from moving fluid (e.g., liquids and gasses). Improvements may address various areas including structure and control of the machine(s). These improvements may increase operating efficiency and/or reduce capital expenses and operating costs for the machine.

SUMMARY

The subject matter of this disclosure relates generally to embodiments of a valve for use to regulate steam in turbo-machinery and, generally, industrial equipment that act on a working fluid to distribute the working fluid under pressure. The term "turbo-machinery" can embody turbines and power generating equipment, as well as pumps, compressors, and blowers, wherein at least one difference between different types of equipment may reside in the operating pressure of working fluid that exits the machine.

Some embodiments can vary flow parameters of working fluid that flows in a turbine. The turbine can include a rotor and a stator, each with blades disposed in the flowpath to guide and regulate flow properties of steam. In one implementation, the embodiment can reside in the flowpath to regulate the flow of steam that impinges on the blades and, in turn, cause the steam to exit the turbine to an extraction unit. Examples of the extraction unit can divert the steam to operate boilers, heaters, and like equipment that is collateral to the turbine.

The improvements herein offer many capabilities and/or advantages. For example, turbines that incorporate the embodiments can forego external valves and collateral equipment necessary to regulate flow of extracted steam. This feature simplifies construction and, effectively, reduces costs of the machine. Moreover, these turbines may enjoy smaller and/or reduced footprints, which can simplify shipping, handling, and installation at a facility.

The embodiments herein may incorporate elements and features, one or more of the elements and features being interchangeable and/or combinable in various combinations, examples of which may include:

In one embodiment, a turbine comprising a rotor with a rotor blade and a valve assembly disposed upstream of the rotor blade, the valve assembly comprising a plurality of segments that form a ring, wherein the plurality of segments are configured to move radially inwardly and outwardly to regulate flow of a working fluid across the blade.

In one embodiment, a segment for use in a valve assembly, the segment having an arcuate body forming an arc with an arc length and angle that is in a range of 60° to 180°.

In one embodiment, a ring member for use in a valve assembly, the ring member comprises a plurality of segments, each having an arcuate body forming an arc with an arc length and angle that is in a range of 60° to 180°.

In one embodiment, a valve assembly comprising a body member having a plurality of individual arcuate segments, a plurality of coupling members, one each disposed between adjacent ones of the individual arcuate segments, and an actuator coupled with the plurality of individual arcuate segments, wherein the body member is configured so that actuation of the actuator causes the individual arcuate segments to move to the same position.

In one embodiment, a coupling member for use in a valve assembly, the coupling member forming a plate with a boss member extending along a side of the plate.

In one embodiment, a method for regulating flow of steam in a turbine, said method comprising varying an aperture downstream of a rotor blade to direct flow of fluid to an extraction unit.

BRIEF DESCRIPTION OF THE DRAWINGS

Reference is now made briefly to the accompanying drawings, in which:

FIG. 10 depicts a plan view of an example of the body member of FIG. 7;

FIG. 11 depicts an elevation view of the cross-section of the body member of FIG. 10;

FIG. 12 depicts an elevation view of the cross-section of one end of the body member of FIG. 10;

FIG. 13 depicts an elevation view of the cross-section of one end of the body member of FIG. 10;

FIG. 14 depicts a plan view of an example of a coupling member for use as part of the body member of FIG. 7;

FIG. 15 depicts an elevation view of the side of the coupling member of FIG. 14;

FIG. 16 depicts an elevation view of the side of the coupling member of FIG. 14;

FIG. 17 depicts an elevation view of the front of the coupling member of FIG. 14;

FIG. 18 depicts an elevation view of the back of the coupling member of FIG. 14;

Figure 1:
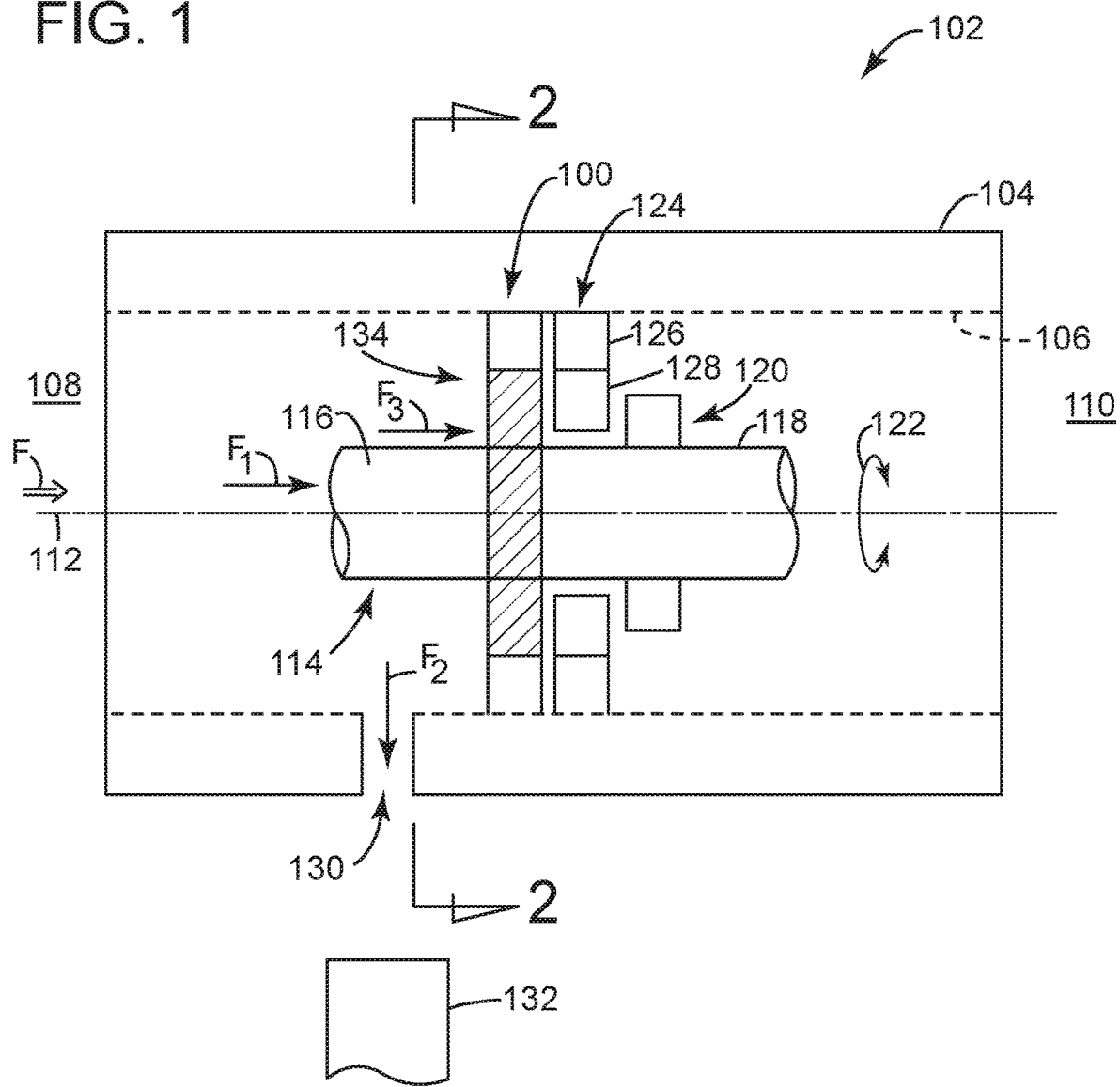
FIG. 1 depicts, schematically, an elevation view of an exemplary embodiment of a valve for use in a power-generating system.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes embodiments of a valve for use to regulate flow of fluid in a turbine. The embodiments can deploy in the turbine, often having structure that circumscribes part of the rotor. This structure may define an aperture that receives the rotor. Actuation of the structure can change the size of the aperture to "open" and "close" the valve relative to the rotor. These changes can vary the flow of fluid across the rotor and in contact with the rotor blades and, in one example, a second flow of fluid that exits the turbine. The second flow of fluid can be directed to other parts of the turbine or collateral equipment, in general. In one implementation, the second flow of fluid can operate a boiler (also, "heater") that provides feedwater to a steam generator. This steam generator can generate the steam to operate the turbine. Other embodiments and implementations are within the scope of the disclosed subject matter.

FIG. 1 depicts a schematic diagram of an exemplary embodiment of a valve 100 that can facilitate extraction of steam from a turbine. The valve 100 can be disposed in a power generating system 102 (also, "system 102"). The system 102 can embody a turbine or like apparatus that may be configured to generate power (e.g., electrical power) from a flow of working fluid F. Examples of working fluid F include steam, often under high pressure, although the system 102 may use water and/or other fluids and gasses.

The system 102 can have a casing 104 that forms the base structure for the machine. The casing 104 may define a fluid pathway 106 with a first end 108 (also, "inlet 108") and a second end 110 (also, "outlet 110"). The fluid pathway 106 may be generally annular with an axis 112 that extends longitudinally between the ends 108, 110. Inside of the casing 104, the system 102 may include a rotor 114 that resides in the fluid pathway 106. The rotor 114 can have a rotor body 116 that extends through the valve 100. The body 116 has an outer surface 118 having one or more rotor blades 120 formed thereon. As also shown in FIG. 1, the system 102 can also include a stator blade assembly 124 interposed between the valve 100 and the rotor blades 120. The stator blade assembly 124 can include a blade carrier 126, typically a plate or like structure that circumscribes the rotor 114 and couples with the casing 104. One or more stator blades 128 can populate the circumference of this plate.

The casing 104 may be configured to allow some of the fluid F to escape or exit the system 102. In FIG. 1, this configuration employs one or more openings (e.g., a first opening 130). The openings 130 can allow the fluid pathway 106 to communicate (as second flow $F_2$) with a conduit 132 (e.g., a pipe) that couples with the casing 104. The conduit 132 can also couple with other parts of the system 102 or with collateral equipment, as desired. Often, this collateral equipment is part of a heating system that boils water to provide steam for the fluid F. During operation, fluid F flows (as first flow $F_1$) through the fluid pathway 106. The flow can bifurcate into the second flow $F_2$ and a third flow $F_3$, which can contact with the rotor blades 120 to induce rotation of the rotor 114, as indicated by the arrow identified with the numeral 122. The stator blades 128 are useful to manage flow characteristics of the third flow $F_3$.

The valve 100 may be used to regulate the flows $F_2$, $F_3$. In FIG. 1, the valve 100 may define a flow area 134 that can change in size relative to the rotor body 116. These changes regulate parameters for the flow of working fluid F across the rotor 114 (as the third flow $F_3$) and, also, the flow of working fluid F out of the openings 130 (as the second flow $F_2$). As noted above, the third flow $F_3$ causes rotation 122 of the rotor 114 to generate power in the system 102. The second flow $F_2$ can enter the conduit 132 for use in equipment that pre-heats water before the water is boiled into steam for use as the working fluid F. Using the valve 100 to regulate the parameters of the flows $F_2$, $F_3$ from inside the fluid pathway 106 eliminates many collateral devices (e.g., valves, conduits, etc.) that might be necessary to regulate extraction of working fluid from the system 102 as the second flow $F_2$. This feature can reduce the footprint and/or operating envelope for the system 102. This smaller, more compact design may be easier to move and install at an installation site.

Figure 2:
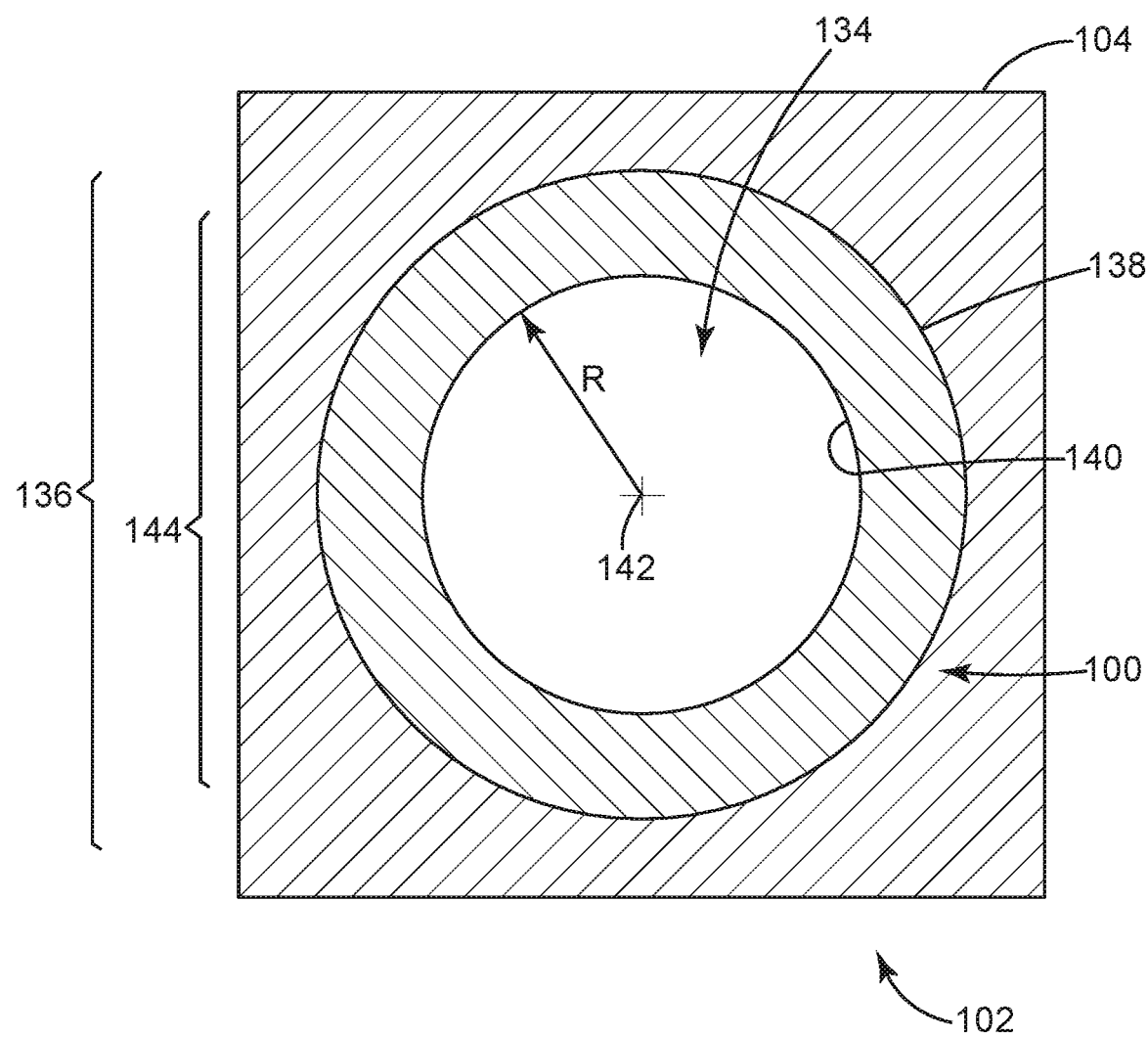
FIG. 2 depicts, schematically, an elevation view of the cross-section of the power generating system of FIG. 1 in partially assembled form.

FIG. 2 illustrates an elevation view of the cross-section of the system 102 taken at line 2-2 of FIG. 1. Some parts of the system 102 including the rotor 114 and stator assembly 124 have been removed for clarity and to focus the discussion on an example of the valve 100. This example includes a body member 136 with a form factor that is circular or annular, although this disclosure contemplates other shapes (e.g., rectangular, square, oval, etc.) for use as the form factor as well. In one example, the body member 136 forms a ring 138 with an inner peripheral edge 140 disposed circumferentially around a center 142. The inner peripheral edge 140 can bound an aperture 144 that forms the flow area 134. For circular and/or annular shapes like the ring 138, the aperture 144 can have a radius R as measured between the inner peripheral edge 140 and the center 142.

Figure 3:
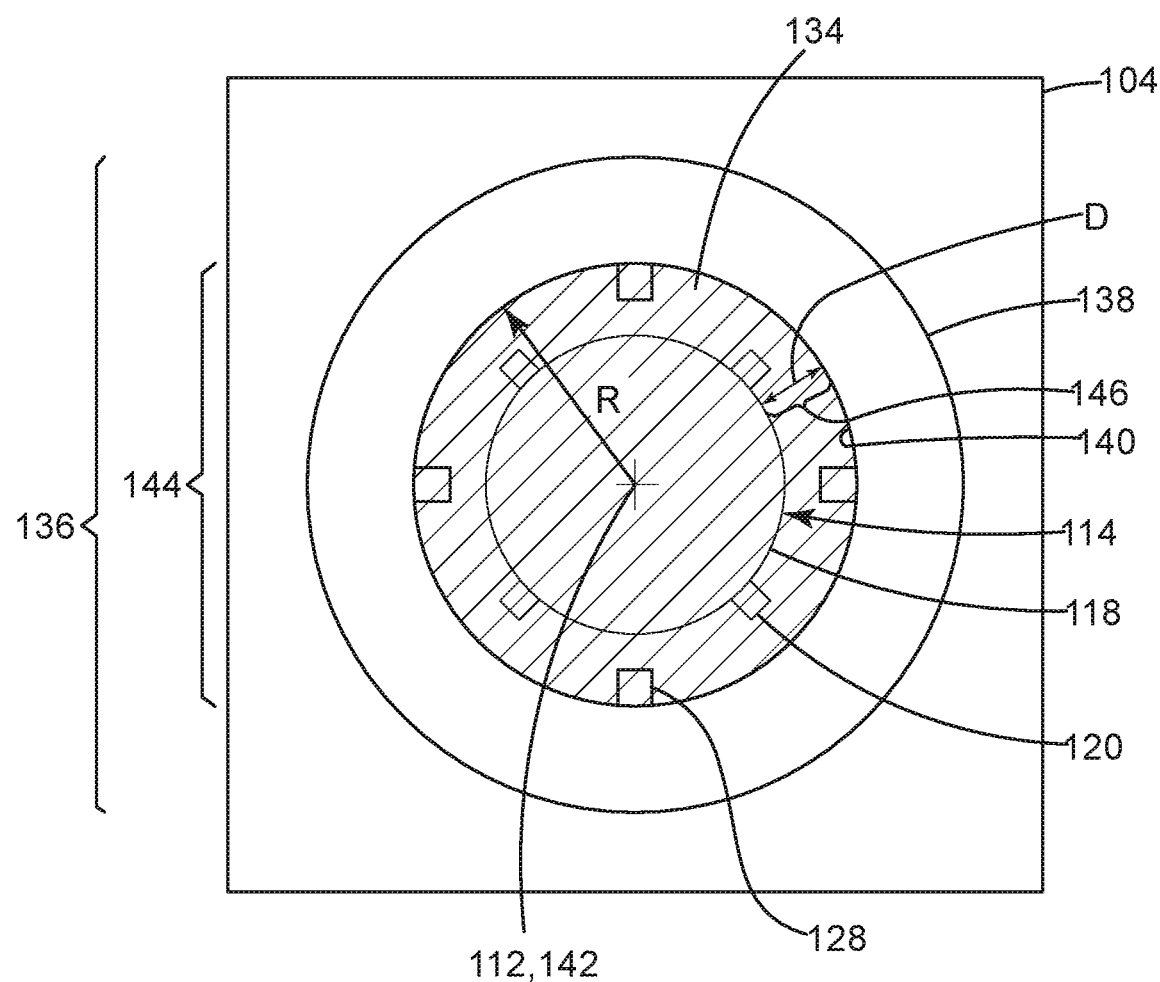
FIG. 3 depicts, schematically, the power generating system of FIG. 2 in partially assembled form.

FIG. 3 illustrates the elevation view of FIG. 2 with the rotor 114 in position in the fluid pathway 106 (FIG. 1). This position locates the rotor 114 so that the inner peripheral edge 140 is spaced apart from the outer surface 118 of the rotor 114 by a distance D. This spacing forms an annular gap 146. The third flow $F_3$ flows through the annular gap 146 to impinge on the rotor blades 120 and stator blades 128. Actuation of the body member 136 can vary the distance D to modify the annular gap 146 and, in turn, regulate flow parameters of the second flow $F_2$ and also the third flow $F_3$, discussed above. In one implementation, the value of the distance D may be approximately uniform circumferentially around the center 142, taking into consideration design and manufacturing tolerances of the ring 138, the valve 100, and the components of the system 102 generally. In other implementations, the value for the distance D may not be uniform or may vary circumferentially around the center 142 because of the form factor and/or construction of the body member 136. The discussion below describes one construction with multiple parts, or segments, that make up the ring 138. Dimensions for the segments can result in variations of the distance D substantially consistent with the aperture 144 having a plurality of lobes or bulges.

Figure 4:
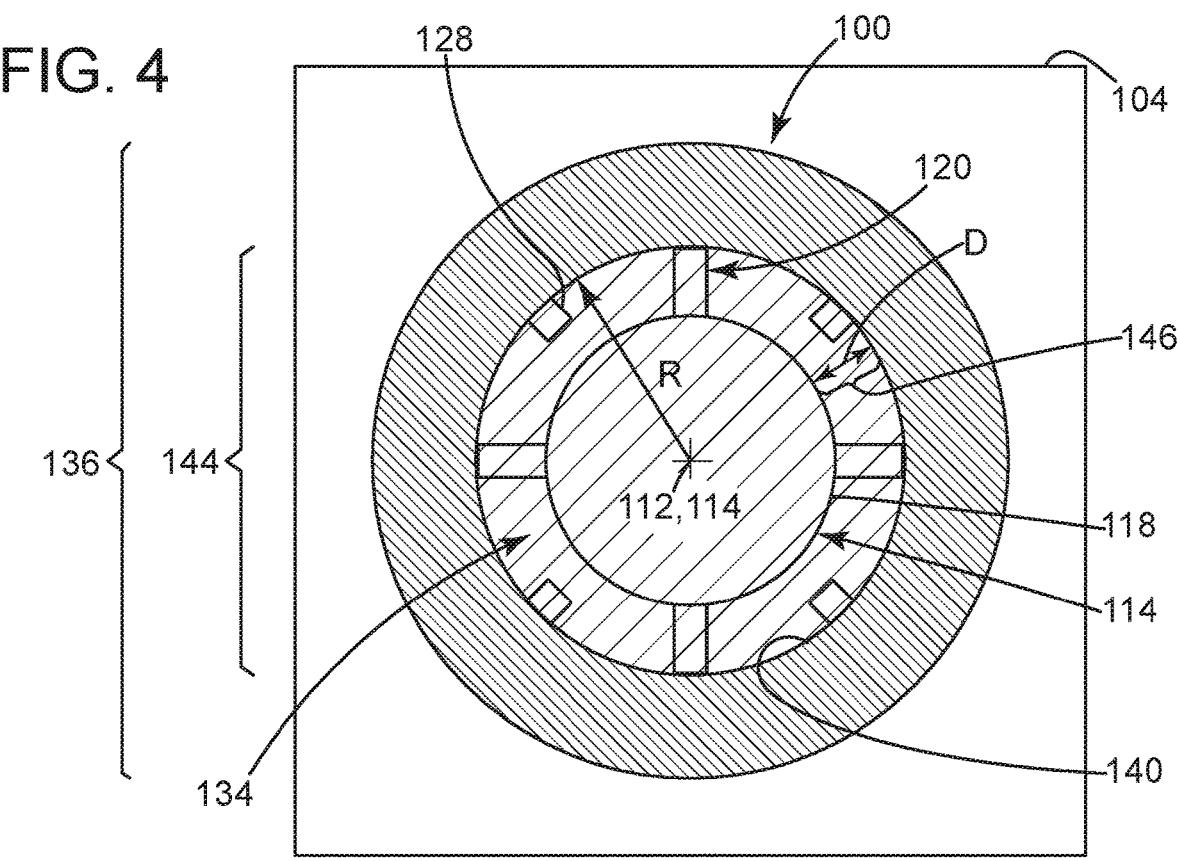
FIG. 4 depicts, schematically, the power generating system of FIG. 3 in partially assembled form with the valve in a first configuration.
Figure 5:
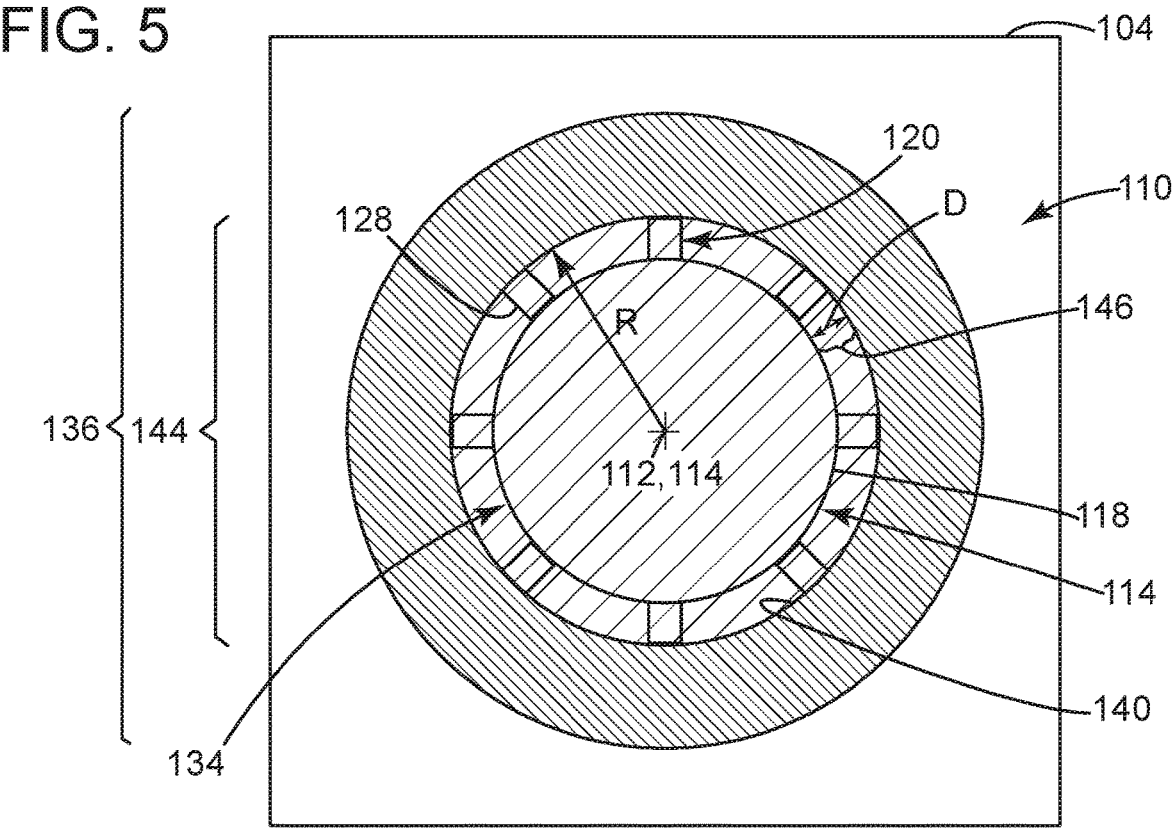
FIG. 5 depicts, schematically, the power generating system of FIG. 3in partially assembled form with the valve in a second configuration.
Figure 6:
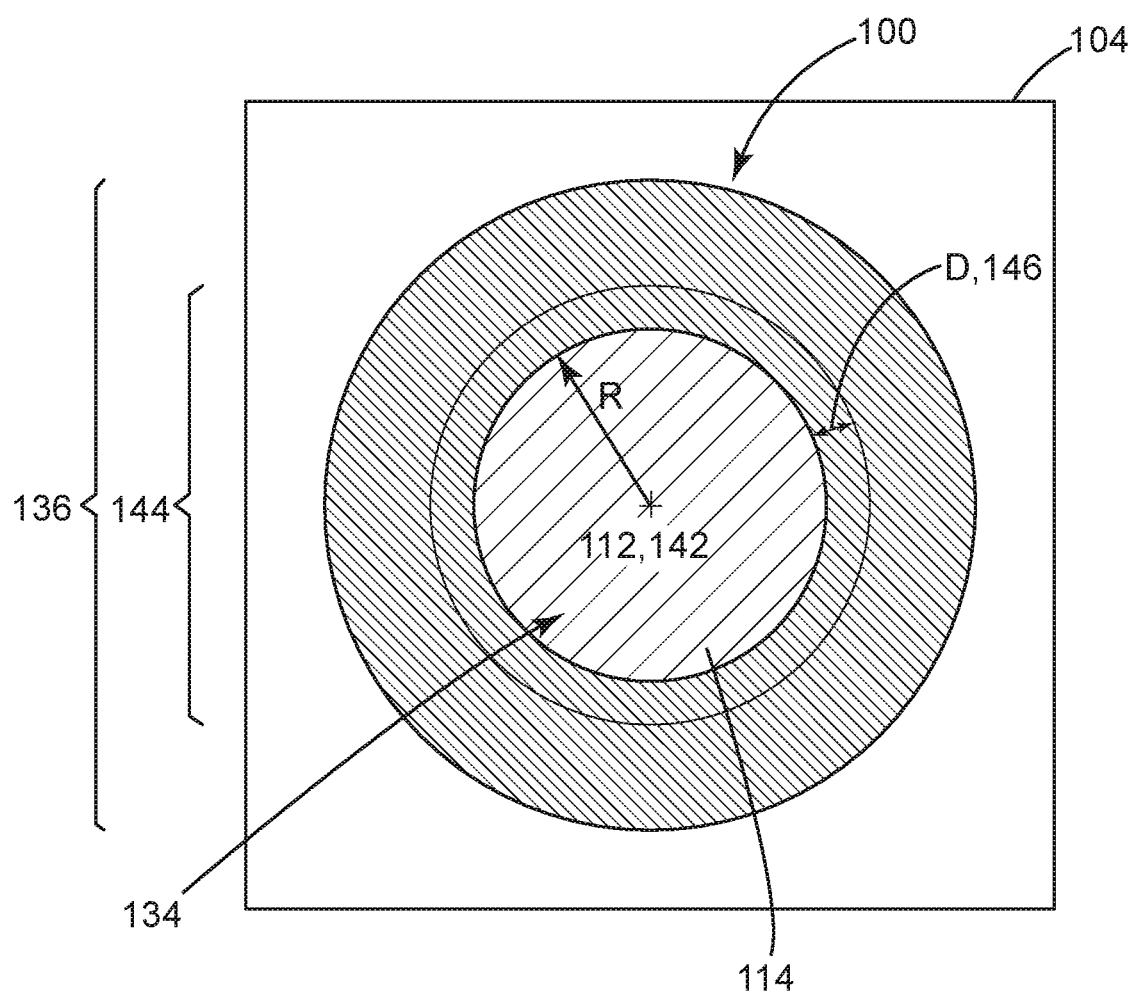
FIG. 6 depicts, schematically, the power generating system of FIG. 3 in partially assembled form with the valve in a third configuration.

FIGS. 4, 5, and 6 depict the elevation view of FIG. 3 with the valve 100 in various configurations to modify the distance D of the annular gap 146. These configurations are useful to illustrate operation of this example of the valve 100 to regulate flow of working fluid F. FIG. 4 shows the body member 136 of the valve 100 in a first configuration (also, "open configuration"). The rotor blades 120 and the stator blades 128 are fully visible in this configuration. FIGS. 5 and 6 show the body member 136 of the valve 100 in a second configuration (also, "intermediate configuration") and a third configuration (also, "closed configuration"), respectively. The rotor blades 120 and the stator blades 128 are only partially visible in the second configuration because the valve 100 has reduced or constricted the size of the annular gap 146 slightly. In the third configuration, the blades 120, 128 are not visible because the valve 100 has reduced or constricted the size of the annular gap 146 to, effectively, the diameter of the rotor 114. The closed configuration causes most, if not all, of the working fluid F to exit as the second flow $F_2$.

Values for each of the flow F2, F3 can vary in accordance with the configuration of the valve 100. At a high level, these values may satisfy Equation (1) below:

$$F_1 = F_2 + F_3,\qquad\text{Equation (1)}$$

Table 1 below summarizes some exemplary values

| Configuration | Value for $F_2$ | Value for $F_3$ |
| --- | --- | --- |
| $1^{st}$ or open (FIG. 4) | 0 | $F_1$ |
| $2^{nd}$ or intermediate (FIG. 5) | $F_1$-$F_3$ | $F_1$-$F_2$ |
| $3^{rd}$ or closed (FIG. 6) | $F_1$ | 0 |

Each configuration of the valve 100 may correspond with movement of at least part of the body member 136. The parts may move radially inwardly and outwardly relative to the center 142. This movement sets a position for the inner peripheral edge 140 (and/or other part of the ring 138) relative to the center 136. The position defines a value for the radius R of the aperture 144 and, in turn, the value for the distance D of the annular gap 146. In the open configuration of FIG. 4, the distance D assumes a first value. The intermediate configuration of FIG. 5 results in a second value for the distance D that is less than the first value. Likewise, the closed configuration of FIG. 6 results in a third value for the distance D that is less than both the first value and the second value.

Figure 7:
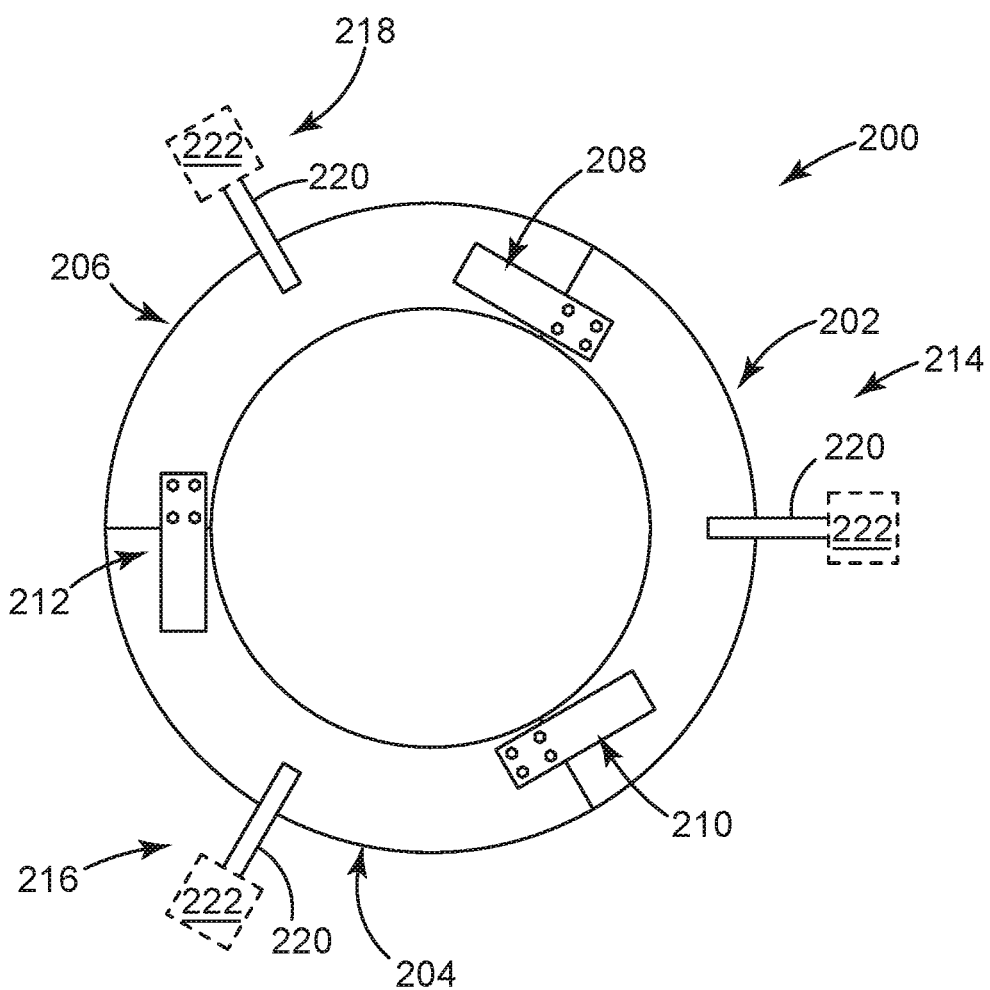
FIG. 7 depicts an elevation view of an example of the body member for use to construct the valve of FIG. 1.

FIG. 7 depicts an elevation view of the front of an example of a body member 200 for use in or as part of the valve 100 (FIGS. 1 and 3). The body member 200 may form an assembly (also, "system") that includes one or more segments (e.g., a first segment 202, a second segment 204, and a third segment 206). The segments 202, 204, 206 can each comprise a thin metal and/or composite plate. The thin plates can combine to form the annular (and/or circular) geometry of the ring 138 (FIG. 3). The body member 200 can also include one or more coupling members (e.g., a first coupling member 208, a second coupling member 210, and a third coupling member 212), one each disposed between adjacent ends of the segments 202, 204, 206. As also shown in FIG. 7, the body member 200 may include one or more actuator members (e.g., a first actuator member 214, a second actuator member 216, and a third actuator member 218). The actuator members 214, 216, 218 can be configured with a yolk member 220 that extends radially from the segments 202, 204, 206. The yolk member 220 may be configured to direct a force F from a force-generating device 222 to the segments 202, 204, 206. Examples of the force-generating device 222 may include linear actuators, pneumatic cylinders, and lead screws, among many others. In one implementation, the body member 200 may also include a mechanism (e.g., a linkage) that can be interposed between the yolk member 220 and the force-generating device 222. This mechanism can be configured to generate the force F in response to movement, loading, and/or outputs, generally, that relate to operation of the force generating device 222. In other implementations, the force generating device 222 may couple directly to the respective segments 202, 204, 206.

Figure 8:
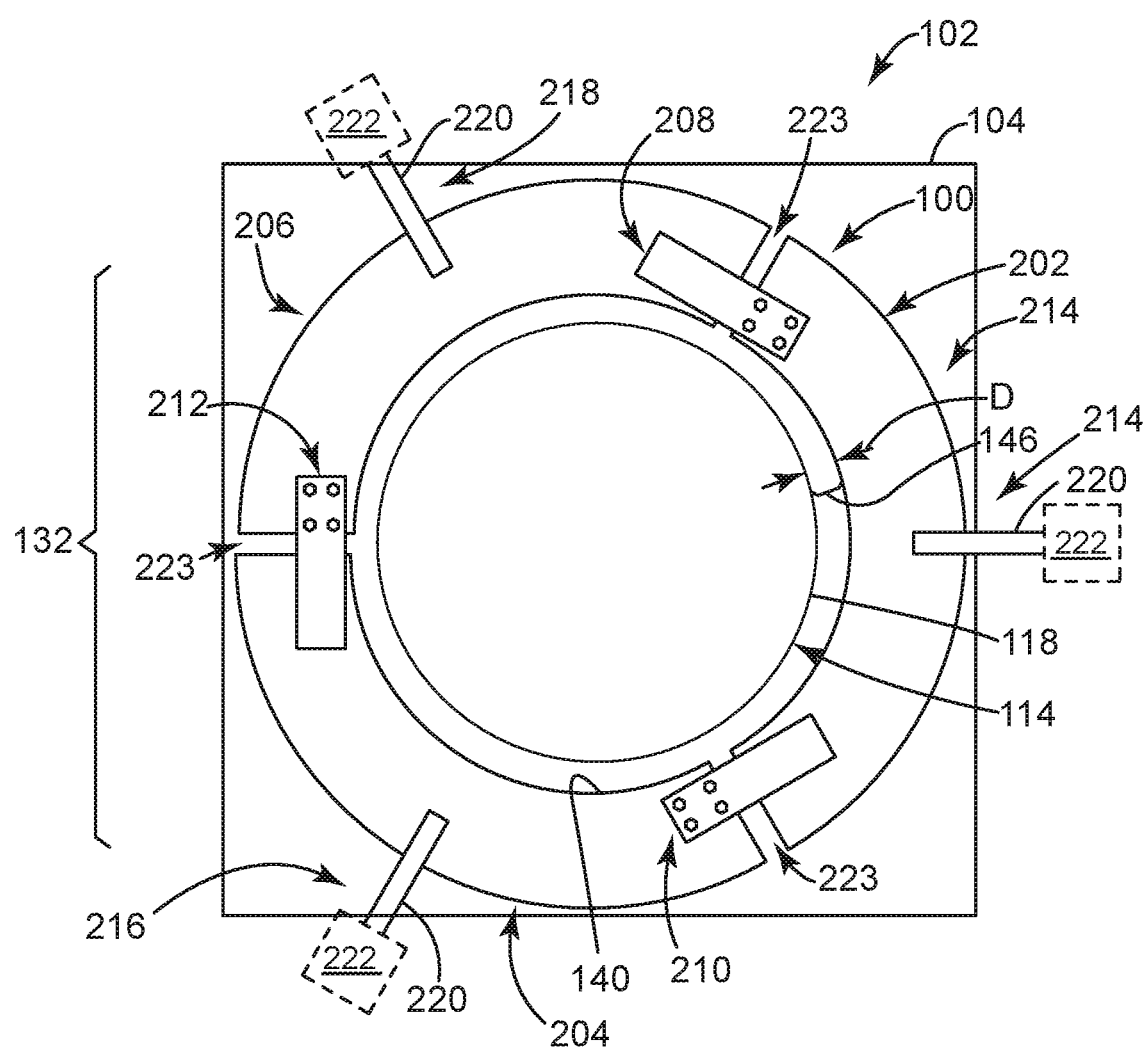
FIG. 8 depicts an elevation view of the body member of FIG. 7.
Figure 9:
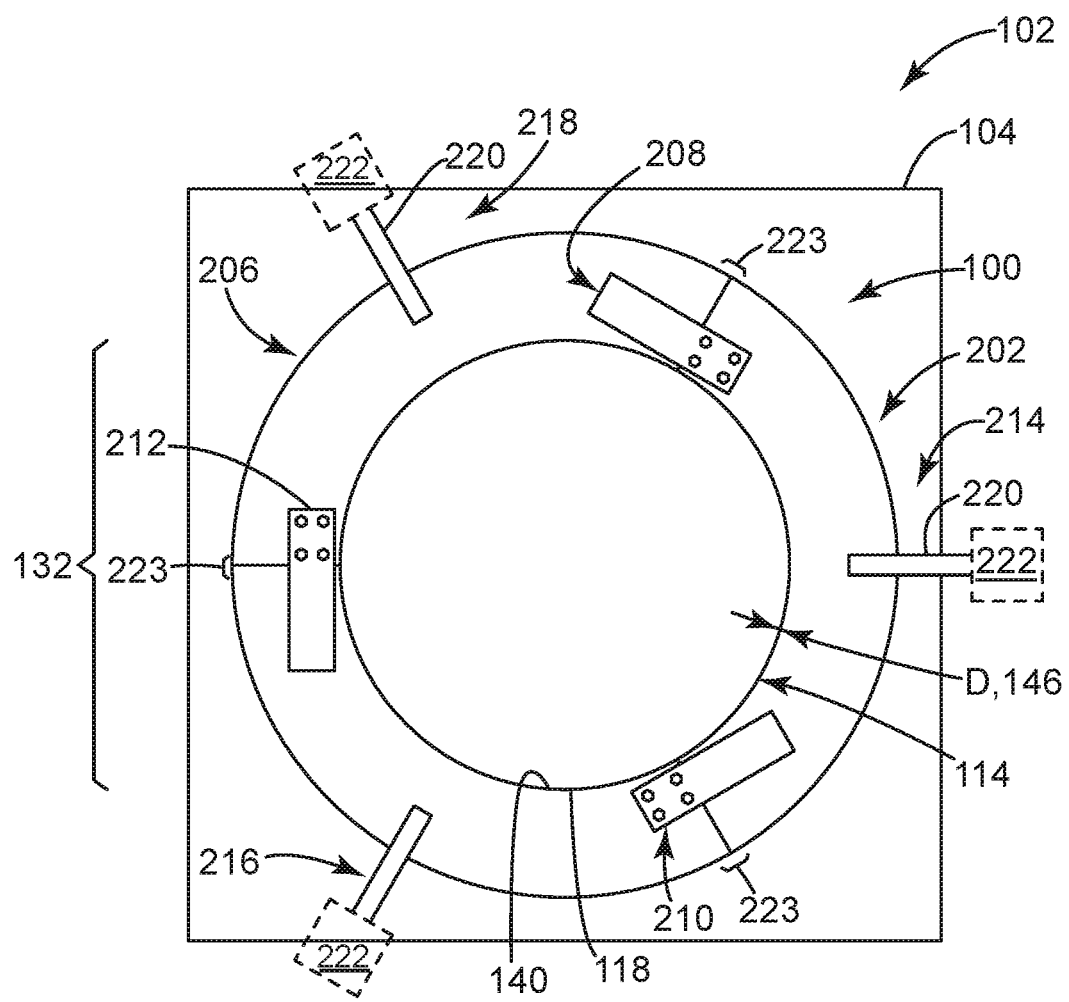
FIG. 9 depicts an elevation view of the body member of FIG. 7.

FIGS. 8 and 9 depict the elevation view of the cross-section of the system 102 of FIG. 3 with the valve 100 is arranged in accordance with the example of the body member 200 (FIG. 7). In FIG. 8, the configuration of the segments 202, 204, 206 corresponds with the valve 100 in the open configuration and/or partially-open intermediate configuration. FIG. 9 shows the segments 202, 204, 206 configured so that the valve 100 is in the closed configuration. As noted above, operation of the actuator members 214, 216, 218 can cause the segments 202, 204, 206 to move radially inwardly and outwardly toward the center 136. In one implementation, the segments 202, 204, 206 can move relative to one another to form gaps 223 in the ring 132. The size of the gaps 223 may vary in response to direction and magnitude of radial movement.

Comparing FIGS. 8 and 9, radial movement can change the configuration of the valve 100 as between the open/partially-open configuration (FIG. 8) and the closed configuration (FIG. 9). It may be preferred that the segments 202, 204, 206 move synchronously or, at least, arrive at the same position relative to the center 142 (FIG. 2) to maintain alignment about body member 200. This feature may require certain bearing arrangements and/or other alignment features to maintain consistent movement of the segments 202, 204, 206 relative to one another and to the center 142 (FIG. 2).

The coupling members 208, 210, 212 can be configured to provide a blocking surface that spans the gaps 223. This blocking surface can prevent fluid from flowing (as third flow $F_3$) through the valve 100 at adjacent ends of the segments 202, 204, 206. During and after actuation of the valve 100, the blocking surface may provide continuity of the forward (or upstream) facing surface on each of the adjacent segments 202, 204, 206.

The valve 100 may also be equipped to interface with the outer surface 118 of the rotor 114 to prevent fluid flow through the valve 100. In one implementation, the valve 100 can include a sealing mechanism that creates a seal between the inner peripheral edge 140 and the outer surface 118 of the rotor 114. This seal can cover any space between the rotor 114 and the inner edge of the segments 202, 204, 206 in the closed configuration. Due to manufacturing limitations, this space may be in a range of 2 mm or less, and it may be desirable to minimize and/or eliminate any space for more suitable operations of the device. Examples of the sealing mechanism can include back-spring seals, brush seals, and like device that can help reduce and/or prevent flow of fluid. With reference to FIG. 1, accuracy of the device may correspond with appropriate parameters for the flow of working fluid F, both across the rotor 114 (as the third flow $F_3$) and exiting the fluid pathway 106 (as the second flow $F_2$).

FIGS. 10, 11, 12, and 13 illustrate various views for an example of the segments 202, 204, 206. FIG. 10 illustrates a plan view of the top of the example. FIG. 11 illustrates an elevation view of the cross-section of the example of FIG. 10 taken at line 11-11. FIGS. 12 and 13 illustrate an elevation view of the cross-section of the example of FIG. 10 taken at line 12-12 and line 13-13, respectively.

With reference to FIGS. 10 and 11, the example has an arcuate body 228 that terminates at a pair of ends (e.g., a first end 230 and a second end 232). The arcuate body 228 can form a flat plate (as shown in FIG. 11), preferably made or comprised of metal and/or metal alloys. The shape of flat plate can form an arc with an arc length L as measured between the ends 230, 232. This arc can subtend an angle α. Values for the arc length L and/or the angle α may be approximately the same across all of the segments 202, 204, 206 (FIGS. 7, 8, and 9). In other examples, the angle α may assume values in a range of from approximately 60° to approximately 180°. In one implementation, the arc length L and/or angle α area may be individually configured so that the segments 202, 204, 206 will form the ring 132 (FIG. 3) as noted herein.

The arcuate body 228 can have one or more coupling features (e.g., a first coupling feature 234 and a second coupling feature 236). The coupling features 234, 236 configure the flat plate to receive (or host) the coupling members 208, 210, 212 (FIG. 8) proximate the ends 230, 232. At a high level, geometry from the coupling features 234, 236 allow sliding engagement of the coupling members 208, 210, 212 to prevent sticking that can frustrate operation of the valve 100. This geometry can vary, as desired. In FIG. 11, at the first end 230, the first coupling feature 234 forms a first recess 238 that penetrates into the flat plate. The first recess 238 can have a bottom 240 and a peripheral side wall 242 that terminates at the end 230. One or more openings 244 may populate the first recess 238. As best shown in FIG. 13, the openings 244 can penetrate through the flat plate in the first recess 238. The openings 244 may correspond with openings and/or fasteners (e.g., screws, bolts, etc.) found in the coupling members 208, 210, 212. The openings 244 can include threads and/or be sized to receive the fastener, as desired.

Referring back to FIG. 11, at the second end 232, the second coupling feature 236 may form a second recess 246 that penetrates into the flat plate. The second recess 246 has a first portion 248 and a second portion 250. A peripheral sidewall 252 bounds each of the portions 248, 250 and terminates at the end 232. As best shown in FIG. 14, the recess 244 includes a step 254 that forms a pair of bottom surfaces (e.g., a first bottom 256 and a second bottom 258) in the portions 248, 252, respectively. The bottoms 256, 258 are at different depths in the flat plate to accommodate geometry for the coupling members 208, 210, 212, as discussed more below.

FIGS. 14, 15, 16, 17, and 18 illustrate various views for an example of the coupling members 208, 210, 212. FIG. 14 is a plan view of the top of the example. FIGS. 15 and 16 depict elevation views of the sides of the example. FIGS. 17 and 18 depict elevation view of the front and back of the example, respectively.

In FIG. 14, the example has a generally elongate, rectangular body 260 with a front 262, a back 264, and sides (e.g., a first side 266 and a second side 268). The body 260 can have one or more openings 270 that are arranged to correspond with the openings 244 (FIG. 10) of the arcuate body 238 (FIG. 10) discussed above. As shown in FIGS. 15 and 16, the body 260 can take the form of a flat plate. On the first side 266, the flat plate can include a boss member 272, which may be a separate piece that secures to the flat plate. The boss member 272 may also be formed unilaterally or monolithically with the flat plate by machining these features from a block (or billet) of material. Suitable material may include metals and metal alloys, although other materials exhibit suitable material properties for use in the rectangular body 260. The boss member 272 can be sized to fit into the second portion 250 (FIG. 10) of the second recess 246 (FIGS. 10 and 13). In one implementation, the boss member 272 can extend from the back 264 toward the front 266, or vice versa.

Figure 19:
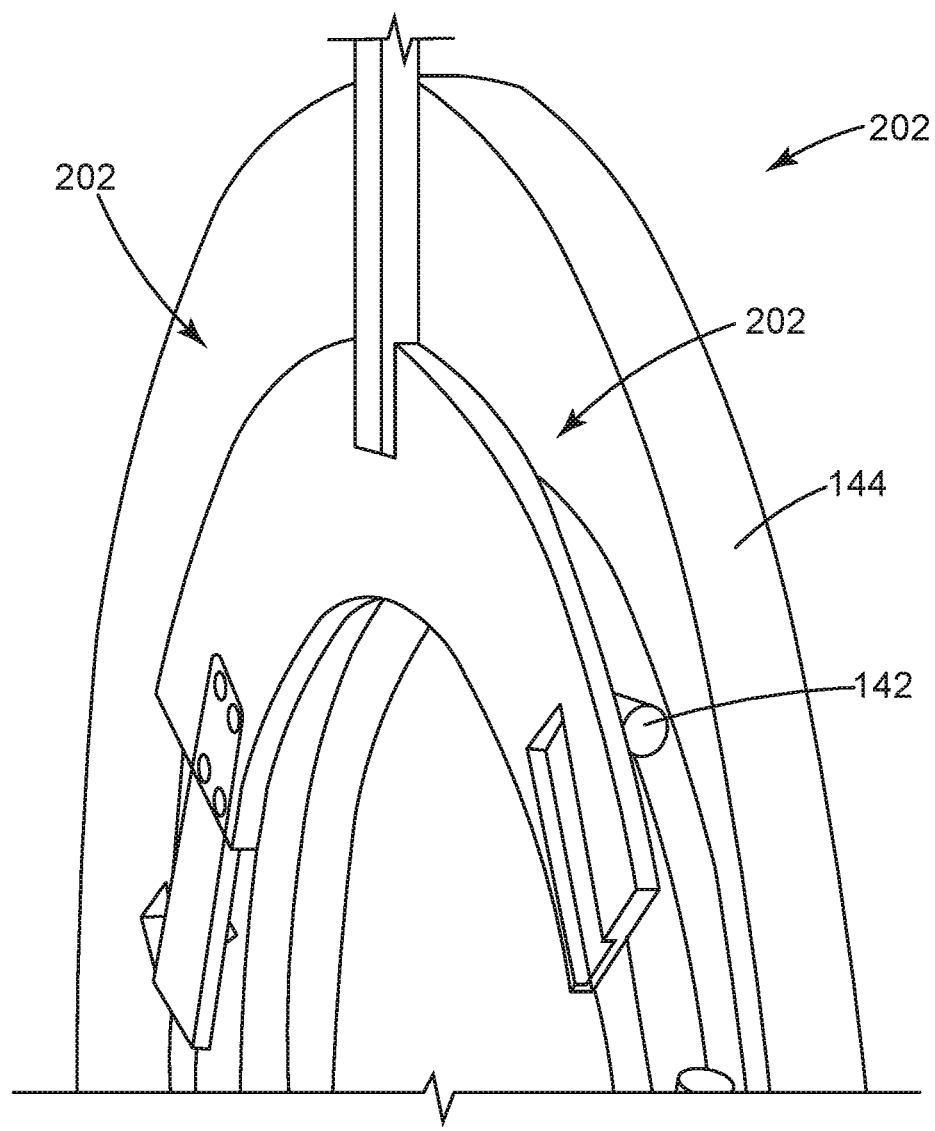
FIG. 19 depicts a perspective view of the power-generating system of FIG. 1 in partially-assembled form.

FIG. 19 illustrates a perspective view of the system 102 of FIG. 3. The valve 100 has a construction similar to the example of the body member 200 of FIG. 8. This example includes one or more bearing members (e.g., bearing member 142). The bearing members 142 can interpose between the segments 202, 204, 206 and a part of the system 102 and/or casing 104 (FIG. 1), shown here as a blade carrier 144. The segments 202, 204, 206 may include a groove or other feature to receive at least part of the bearing member 142. Generally, the bearing members 142 can embody devices that reduce sliding friction that may frustrate movement of segments 202, 204, 204 relative to the blade carrier 144. These devices may include roller bearings, bearing slides, dovetail bearings, although any number of different kinds of bearings and bearing-like devices and materials might be applicable herein.

Figure 20:
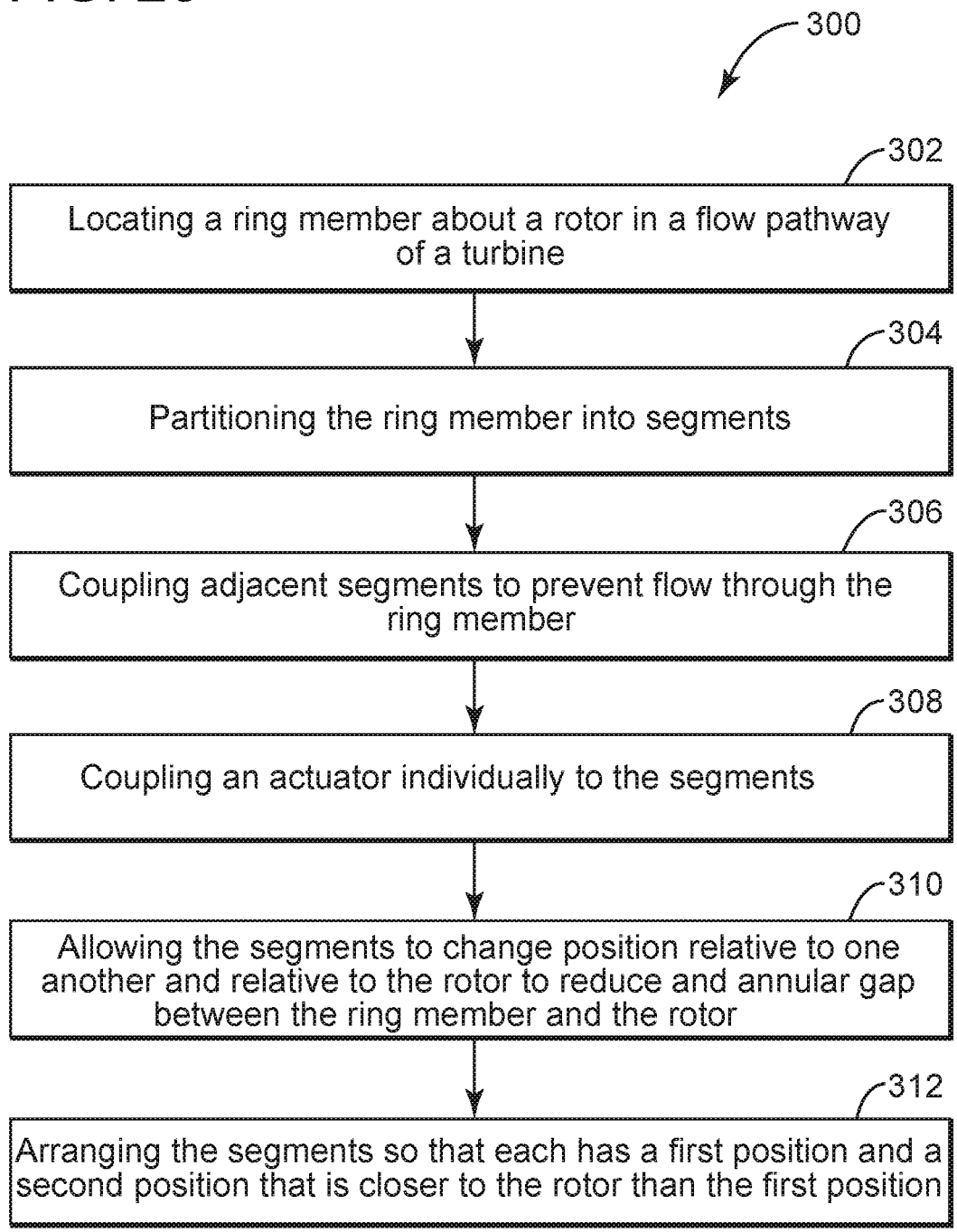
FIG. 20 depicts a flow diagram of an exemplary embodiment of a method for modulating flow through a turbine.

FIG. 20 depicts a flow diagram of an exemplary method 300 for modulating flow across a rotor in a turbine. The method 300 can include, at stage 302, locating a ring member about a rotor in a flow pathway of a turbine and, at stage 304, partitioning the ring member into segments. The method 300 can also include, at stage 306, coupling adjacent segments to prevent flow through the ring member and, at stage 308, coupling an actuator individually to the segments. The method 300 can further include, at stage 310, allowing the segments to change position relative to one another and relative to the rotor to reduce an annular gap between the ring member and the rotor and, at stage 312, arranging the segments so that each has a first position and a second position that is closer to the rotor than the first position.

In light of the discussion above, and FIGS. 1-20 considered herein, the valve 100 can be disposed around the periphery of the rotor 114 to avoid interruption of rotation 122. In operation, steam $F_1$ flows through the fluid pathway 106 to impinge on the valve 100. With the valve 100 open, steam $F_3$ can impinge on the rotor blades 120, causing the rotor 114 to turn and the turbine 100 to generate electricity. Movement of the actuators 214, 216, 218, preferably simultaneously or in concert, can change the position of segments 202, 204, 206 to set the size of the aperture 144 of the valve 100. The size of the aperture 144 can cause steam $F_2$ to exit the casing 104.

The valve 100 may require service and maintenance to attend to parts in the system 102. Over time, these parts may experience wear and, possibly, damage that can frustrate operation of the valve 100. A technician may need to extract the valve 100, either in whole or in pieces, to remove existing parts in favor of one or more replacement parts. Examples of replacement parts may originate from an OEM or alternative aftermarket dealer and/or distributor. These examples may be newly constructed using any of the conventional manufacturing and machining techniques (including additive manufacturing and/or "3-D printing"). For certain techniques, a model file that comprises one or more instructions of executable code (on a storage medium and downloadable and/or executable) may be used to define the features of the part. These instructions may cause a machine (e.g., a lathe, milling machine, additive manufacturing machine, etc.) to perform certain functions to result in parts for use in the valve 100.

This disclosure also contemplates that one or more of the replacement parts of the valve 100 may be formed by existing parts. Certain parts may lend themselves to refurbishing an like processes to prepare the existing parts into condition and/or specification for use as the replacement part in the valve 100. Exemplary processes may include buffing, bead-blasting, welding, soldering, machining, and like practices that are useful to build-up and/or remove material from the part, as desired.

The replacement parts may be assembled into the valve 100 as a wholly-constructed assembly. In other implementations, the replacement parts may embody individual parts (e.g., segments 202, 204, 206, actuators 214, 216, 218, coupling members 208, 210, 212), as well as combinations and compilations thereof, possibly in the form of one or more sub-assemblies.

Figure 21:
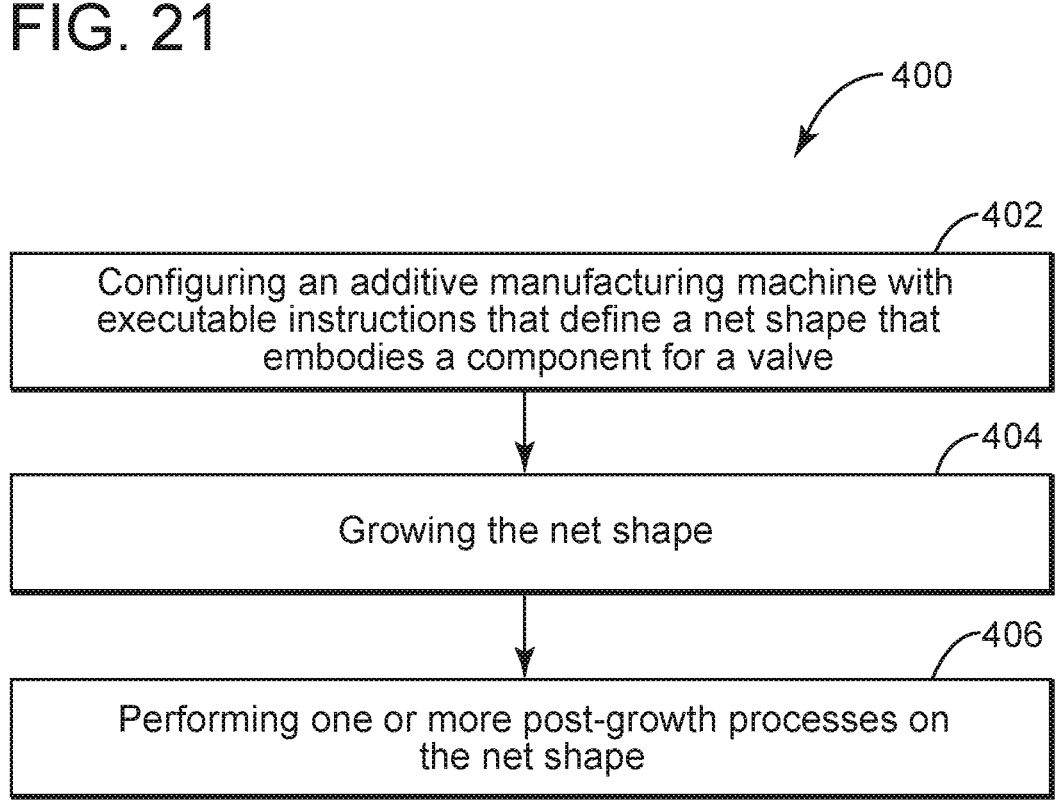
FIG. 21 depicts a flow diagram of an exemplary process to manufacture an example of the components for a valve.

FIG. 21 illustrates an exemplary process 400 to manufacture an example of the components for the valve 100. The exemplary process may leverage additive manufacturing techniques, alone or in combination with one or more other types of subtractive manufacturing techniques. As shown in FIG. 21, the process 400 can include, at stage 402, configuring an additive manufacturing machine with executable instructions that define a net shape. The net shape can embody the body of a component for the valve 100 including, for example, the segments 202, 204, 206 and the coupling members 208, 210, 212 described hereinabove. The process 400 can also include, at stage 404, growing the net shape and, where necessary, at stage 406, performing one or more post-growth processes on the net shape.

Implementations of the process 400 can render embodiments of the components of the valve 100. These implementations may result in, for example, a support member to support a frame in a compressor made by the process of configuring an additive manufacturing machine with executable instructions that define a net shape, growing the net shape, and performing one or more post-growth processes on the net shape. Such implementation that result in the components are also contemplated wherein the one or more post-growth processes comprises heat treating the net shape, and/or comprises deburring the net shape, and/or comprises machining the net shape, and/or comprises apply a surface finish to one or more surfaces of the net shape, and/or comprises removing material of the net shape using abrasives, and/or comprises inspecting the net shape to accumulate dimensional data and comparing the dimensional data to a default value.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow control assembly, comprising:
   a segmented, circular body; and
   coupling members that connect adjacent pieces of the segmented, circular body together to form a ring with an open middle, the coupling members permitting relative movement between adjacent pieces to change dimensions of the open middle.

2. The flow control assembly of claim 1, wherein the coupling members and adjacent pieces form a unitary surface on one side of the segmented, circular body.

3. The flow control assembly of claim 1, wherein the adjacent pieces form equal segments of the ring.

4. The flow control assembly of claim 1, wherein ends of the adjacent pieces are spaced apart from each other in one configuration of the ring.

5. The flow control assembly of claim 1, wherein ends of the adjacent pieces are in contact with each other in one configuration of the ring.

6. The flow control assembly of claim 1, wherein the adjacent pieces move independent from one another.

7. A turbine, comprising:
   a casing defining a fluid pathway;
   a rotor disposed in the fluid pathway, the rotor comprising blades;
   a segmented, circular body upstream of the blades; and
   coupling members that connect adjacent pieces of the segmented body together to form a ring with an open middle allowing the rotor to penetrate through the ring, the coupling members permitting relative movement between the adjacent pieces to change dimensions of the open middle.

8. The turbine of claim 7, wherein the adjacent pieces form equal segments of the ring.

9. The turbine of claim 7, wherein the adjacent pieces move independent from one another.

10. The turbine of claim 7, wherein the adjacent pieces move relative to one another to reduce the open middle.

11. The turbine of claim 7, wherein the adjacent pieces move relative to one another to increase the open middle.

12. The turbine of claim 7, wherein the adjacent pieces move relative to one another to cause the ring to engage the rotor.

13. The turbine of claim 7, further comprising:
    a seal mechanism secured to the ring, wherein the adjacent pieces move relative to one another to cause the seal to engage the rotor.

14. The turbine of claim 7, further comprising:
    force generating members that attach to each of the adjacent pieces.

15. The turbine of claim 7, further comprising:
    actuators equal in number to the adjacent pieces; and
    a yolk member interposed between each of the actuators and the adjacent pieces.

16. The turbine of claim 7, wherein the ring has gaps between ends of adjacent pieces at that correspond with the ring at its greatest diameter.

17. A method, comprising:
    in a turbine having a rotor with blades:
       creating a first flow of steam to turn the turbine;
       directing the first flow of steam toward the blades; and
       separating the first flow at a segmented, circular body upstream of the blades to form a second flow away from the blades and a third flow across the blades.

18. The method of claim 17, further comprising:
    moving individual pieces of the segmented, circular body to increase or decrease the second flow.

19. The method of claim 17, further comprising:
changing dimensions of the segmented, circular body to increase or decrease the second flow.

20. The method of claim 17, further comprising:
changing position of an inner peripheral edge of the segmented, circular body relative to the rotor to increase or decrease the second flow.

\* \* \* \* \*